(12) United States Patent
Shapira et al.

(10) Patent No.: US 10,475,317 B2
(45) Date of Patent: Nov. 12, 2019

(54) SINGLE-ELEMENT DOOR\WINDOW OPENING DETECTOR

(71) Applicant: Tyco Fire & Security GmbH, Neuhausen am Rheinfall (CH)

(72) Inventors: Alexander Shapira, Petakh Tikva (IL); Max Drankovsky, Ashkelon (IL)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 0 days.

(21) Appl. No.: 15/843,763

(22) Filed: Dec. 15, 2017

(65) Prior Publication Data

US 2018/0190092 A1 Jul. 5, 2018

Related U.S. Application Data

(60) Provisional application No. 62/442,082, filed on Jan. 4, 2017.

(51) Int. Cl.
*G08B 13/24* (2006.01)
*G08B 13/08* (2006.01)
(Continued)

(52) U.S. Cl.
CPC ............ *G08B 13/2494* (2013.01); *G01B 7/14* (2013.01); *G01D 5/2405* (2013.01); *G08B 13/08* (2013.01); *G08B 25/10* (2013.01)

(58) Field of Classification Search
CPC ....... G08B 13/2494; G08B 13/08; G01B 7/14
(Continued)

(56) References Cited

U.S. PATENT DOCUMENTS 8,948,711 B2* 2/2015 Kang .................. H04B 17/101
455/114.1
2010/0225482 A1 9/2010 Kasai et al.
(Continued)

FOREIGN PATENT DOCUMENTS

GB       1 603 376 A    11/1981
JP     H05-281172 A    10/1993
(Continued)

OTHER PUBLICATIONS

Search Report, dated Feb. 28, 2017, from GB Application No. 1700938.2, filed on Jan. 19, 2017. 4 pages.
(Continued)

*Primary Examiner* — John A Tweel, Jr.
(74) *Attorney, Agent, or Firm* — Arent Fox LLP

(57) ABSTRACT

An article proximity indicator including at least one antenna having at least first and second ranges of impedance, the second range of impedance being at least partially different from the first range of impedance, the at least one antenna having a first impedance within the first range of impedance when in proximity to an article having a given dielectric constant and having a second impedance within the second range of impedance and not within the first range of impedance when not in proximity to the article having the given dielectric constant, and a proximity indication generator operable, in response to receiving an indication that the impedance of the at least one antenna has changed from being within the first range of impedance to being within the second range of impedance, for generating an indication indicating that the at least one antenna is not in proximity to the article.

38 Claims, 2 Drawing Sheets

(51) Int. Cl.
*G08B 25/10* (2006.01)
*G01B 7/14* (2006.01)
*G01D 5/24* (2006.01)

(58) Field of Classification Search
USPC ...................................................... 340/539.1
See application file for complete search history.

(56) References Cited

U.S. PATENT DOCUMENTS

2012/0182147 A1   7/2012   Forster
2013/0057252 A1   3/2013   Kang
2016/0077029 A1   3/2016   Dempster et al.

FOREIGN PATENT DOCUMENTS

WO    2016060938 A2    4/2016
WO    2016/187283 A1   11/2016
WO    2017/183843 A1   10/2017

OTHER PUBLICATIONS

International Search Report and Written Opinion both dated Oct. 18, 2018, which issued during the prosecution of International Application No. PCT/IL2018/050817.

* cited by examiner

SINGLE-ELEMENT DOOR\WINDOW OPENING DETECTOR

RELATED APPLICATIONS

This application claims the benefit under 35 USC 119(e) of U.S. Provisional Application No. 62/442,082, filed on Jan. 4, 2017, which is incorporated herein by reference in its entirety.

FIELD OF THE INVENTION

The present invention relates generally to door\window opening detector elements and to single-element door\window opening detectors in particular.

BACKGROUND OF THE INVENTION

Commercially available door\window opening detector elements typically comprise two elements: a fixed sensor element mounted on the door\window frame and a fixed magnetic element mounted on the door\window, wherein detection of opening of the door\window is typically achieved by sensing the intensity of the magnetic field generated by the magnetic element mounted on the door\window by the sensor element mounted on the door\window frame. An intensity of the magnetic field which is lower than a pre-calibrated value is typically indicative of opening of the door\window.

The aforementioned arrangement requires a system comprising the installation of two elements, thereby increasing the complexity and cost associated with implementation of the system. There, therefore, arises a need for a single-element door\window opening detector.

SUMMARY OF THE INVENTION

The present invention seeks to provide a single-element door\window opening detector. There is thus provided in accordance with a preferred embodiment of the present invention an article proximity indicator including at least one antenna having at least a first range of impedance and a second range of impedance, the second range of impedance being at least partially different from the first range of impedance, the at least one antenna having a first impedance within the first range of impedance when in proximity to an article having a given dielectric constant and having a second impedance within the second range of impedance and not within the first range of impedance when not in proximity to the article having the given dielectric constant, and a proximity indication generator operable, in response to receiving an indication that the impedance of the at least one antenna has changed from being within the first range of impedance to being within the second range of impedance and not within the first range of impedance, for generating an indication indicating that the at least one antenna is not in proximity to the article.

Preferably, the article proximity indicator also includes a high frequency oscillator operable for generating a high frequency oscillating electromagnetic signal for excitation of the at least one antenna. Preferably, the article proximity indicator also includes a high frequency bridge coupled to the high frequency oscillator and to the at least one antenna and operable for transmitting the high frequency oscillating electromagnetic signal generated by the high frequency oscillator to the at least one antenna and, responsive to receiving the high frequency oscillating electromagnetic signal by the at least one antenna, for measuring an impedance of the at least one antenna and for generating an impedance-dependent electromagnetic signal corresponding to the measured impedance. Preferably, the article proximity indicator also includes a high-frequency amplifier operable for amplifying the impedance-dependent electromagnetic signal generated by the high frequency bridge.

Preferably, the article proximity indicator also includes a high-frequency detector operable for receiving the amplified impedance-dependent electromagnetic signal from the high-frequency amplifier and for generating a direct electrical current corresponding to the amplified impedance-dependent electromagnetic signal. Preferably, the article proximity indicator also includes a low-frequency amplifier operable for amplifying a voltage of the direct electrical current generated by the high-frequency detector. Preferably, the article proximity indicator also includes an analog to digital converter operable for receiving the amplified direct electrical current from the low-frequency amplifier and for converting the amplified direct electrical current into a digital value.

Preferably, the proximity indication generator is also operable for receiving the digital value from the analog to digital converter and for ascertaining, based on the digital value, whether the measured impedance of the at least one antenna has changed from being within the first range of impedance to being within the second range of impedance and not within the first range of impedance.

Preferably, the at least one antenna includes an antenna which is mounted in a plane which is orthogonal to a plane of the article. Preferably, the article is at least mostly made of metallic material. Additionally or alternatively, the at least one antenna includes an antenna which is mounted in a plane which coincides with a plane of the article and the article is at least mostly made of dielectric material.

Preferably, the article proximity indicator also includes at least one varactor operable for tuning the at least one antenna.

There is also provided in accordance with another preferred embodiment of the present invention an article proximity detection method including receiving an indication of a measurement of an impedance of at least one antenna, the at least one antenna having at least a first range of impedance and a second range of impedance, the second range of impedance being at least partially different from the first range of impedance, the at least one antenna having a first impedance within the first range of impedance when in proximity to an article having a given dielectric constant and having a second impedance within the second range of impedance and not within the first range of impedance when not in proximity to the article having the given dielectric constant and, in response to receiving an indication that the impedance of the at least one antenna has changed from being within the first range of impedance to being within the second range of impedance and not within the first range of impedance, generating an indication indicating that the at least one antenna is not in proximity to the article.

Preferably, the article proximity detection method also includes generating a high frequency oscillating electromagnetic signal for excitation of the at least one antenna. Preferably, the article proximity detection method also includes transmitting the high frequency oscillating electromagnetic signal to the at least one antenna. Preferably, the article proximity detection method also includes, responsive to receiving the high frequency oscillating electromagnetic signal by the at least one antenna, measuring an impedance of the at least one antenna and generating an impedance-dependent electromagnetic signal corresponding to the measured impedance. Preferably, the article proximity detection method also includes amplifying the impedance-dependent electromagnetic signal.

Preferably, the article proximity detection method also includes generating a direct electrical current corresponding to the amplified impedance-dependent electromagnetic signal. Preferably, the article proximity detection method also includes amplifying a voltage of the direct electrical current. Preferably, the article proximity detection method also includes converting the amplified direct electrical current into a digital value.

Preferably, the article proximity detection method also includes ascertaining, based on the digital value, whether the measured impedance of the at least one antenna has changed from being within the first range of impedance to being within the second range of impedance and not within the first range of impedance.

Preferably, the at least one antenna includes an antenna which is mounted in a plane which is orthogonal to a plane of the article. Preferably, the article is at least mostly made of metallic material. Additionally or alternatively, the at least one antenna includes an antenna which is mounted in a plane which coincides with a plane of the article and the article is at least mostly made of dielectric material.

Preferably, the article proximity detection method also includes tuning the at least one antenna.

There is also provided in accordance with another preferred embodiment of the present invention a door\window opening detector including at least one antenna having at least a first range of impedance and a second range of impedance, the second range of impedance being at least partially different from the first range of impedance, the at least one antenna having a first impedance within the first range of impedance when in proximity to a door\window having a given dielectric constant and having a second impedance within the second range of impedance and not within the first range of impedance when not in proximity to the door\window having the given dielectric constant, and an alarm indication generator operable, in response to receiving an indication that the impedance of the at least one antenna has changed from being within the first range of impedance to being within the second range of impedance and not within the first range of impedance, for generating an alarm indication of opening of the door\window.

Preferably, the door\window opening detector also includes a high frequency oscillator operable for generating a high frequency oscillating electromagnetic signal for excitation of the at least one antenna. Preferably, the door\window opening detector also includes a high frequency bridge coupled to the high frequency oscillator and to the antenna and operable for transmitting the high frequency oscillating electromagnetic signal generated by the high frequency oscillator to the at least one antenna and, responsive to receiving the high frequency oscillating electromagnetic signal by the at least one antenna, for measuring an impedance of the at least one antenna and for generating an impedance-dependent electromagnetic signal corresponding to the measured impedance. Preferably, the door\window opening detector also includes a high-frequency amplifier operable for amplifying the impedance-dependent electromagnetic signal generated by the high frequency bridge.

Preferably, the door\window opening detector also includes a high-frequency detector operable for receiving the amplified impedance-dependent electromagnetic signal from the high-frequency amplifier and for generating a direct electrical current corresponding to the amplified impedance-dependent electromagnetic signal. Preferably, the door\window opening detector also includes a low-frequency amplifier operable for amplifying a voltage of the direct electrical current generated by the high-frequency detector. Preferably, the door\window opening detector also includes an analog to digital converter operable for receiving the amplified direct electrical current from the low-frequency amplifier and for converting the amplified direct electrical current into a digital value.

Preferably, the alarm indication generator is also operable for receiving the digital value from the analog to digital converter and for ascertaining, based on the digital value, whether the measured impedance of the at least one antenna has changed from being within the first range of impedance to being within the second range of impedance and not within the first range of impedance.

Preferably, the at least one antenna includes an antenna which is mounted in a plane which is orthogonal to a plane of the door\window. Preferably, the at least one antenna is mounted on a door\window at least mostly made of metallic material. Additionally or alternatively, the at least one antenna includes an antenna which is mounted in a plane which coincides with a plane of the door\window, and the at least one antenna is mounted on a door\window at least mostly made of dielectric material.

Preferably, the door\window opening detector also includes at least one varactor operable for tuning the at least one antenna.

Preferably, the alarm indication generator is also operable for transmitting the alarm indication of the opening of the door\window to a premises monitoring system operable for monitoring a premises of the door\window.

There is further provided in accordance with yet another preferred embodiment of the present invention a door\window opening detection method including receiving an indication of a measurement of an impedance of at least one antenna, the at least one antenna having at least a first range of impedance and a second range of impedance, the second range of impedance being at least partially different from the first range of impedance, the at least one antenna having a first impedance within the first range of impedance when in proximity to an door\window having a given dielectric constant and having a second impedance within the second range of impedance and not within the first range of impedance when not in proximity to the door\window having the given dielectric constant and, in response to receiving an indication that the impedance of the at least one antenna has changed from being within the first range of impedance to being within the second range of impedance and not within the first range of impedance, generating an alarm indication of opening of the door\window.

Preferably, the door\window opening detection method also includes generating a high frequency oscillating electromagnetic signal for excitation of the at least one antenna. Preferably, the door\window opening detection method also includes transmitting the high frequency oscillating electromagnetic signal to the at least one antenna. Preferably, the door\window opening detection method also includes, responsive to receiving the high frequency oscillating electromagnetic signal by the at least one antenna, measuring an impedance of the at least one antenna and generating an impedance-dependent electromagnetic signal corresponding to the measured impedance. Preferably, the door\window opening detection method also includes amplifying the impedance-dependent electromagnetic signal.

Preferably, the door\window opening detection method also includes generating a direct electrical current corresponding to the amplified impedance-dependent electromagnetic signal. Preferably, the door\window opening detection method also includes amplifying a voltage of the direct electrical current. Preferably, the door\window opening detection method also includes converting the amplified direct electrical current into a digital value.

Preferably, the door\window opening detection method also includes ascertaining, based on the digital value, whether the measured impedance of the at least one antenna has changed from being within the first range of impedance to being within the second range of impedance and not within the first range of impedance.

Preferably, the at least one antenna includes an antenna which is mounted in a plane which is orthogonal to a plane of the door\window. Preferably, the at least one antenna is mounted on a door\window at least mostly made of metallic material. Additionally or alternatively, the at least one antenna includes an antenna which is mounted in a plane which coincides with a plane of the door\window, and the at least one antenna is mounted on a door\window at least mostly made of dielectric material.

Preferably, the door\window opening detection method also includes tuning the at least one antenna.

Preferably, the door\window opening detection method also comprises transmitting the alarm indication of the opening of the door\window to a premises monitoring system operable for monitoring a premises of the door\window.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1A:
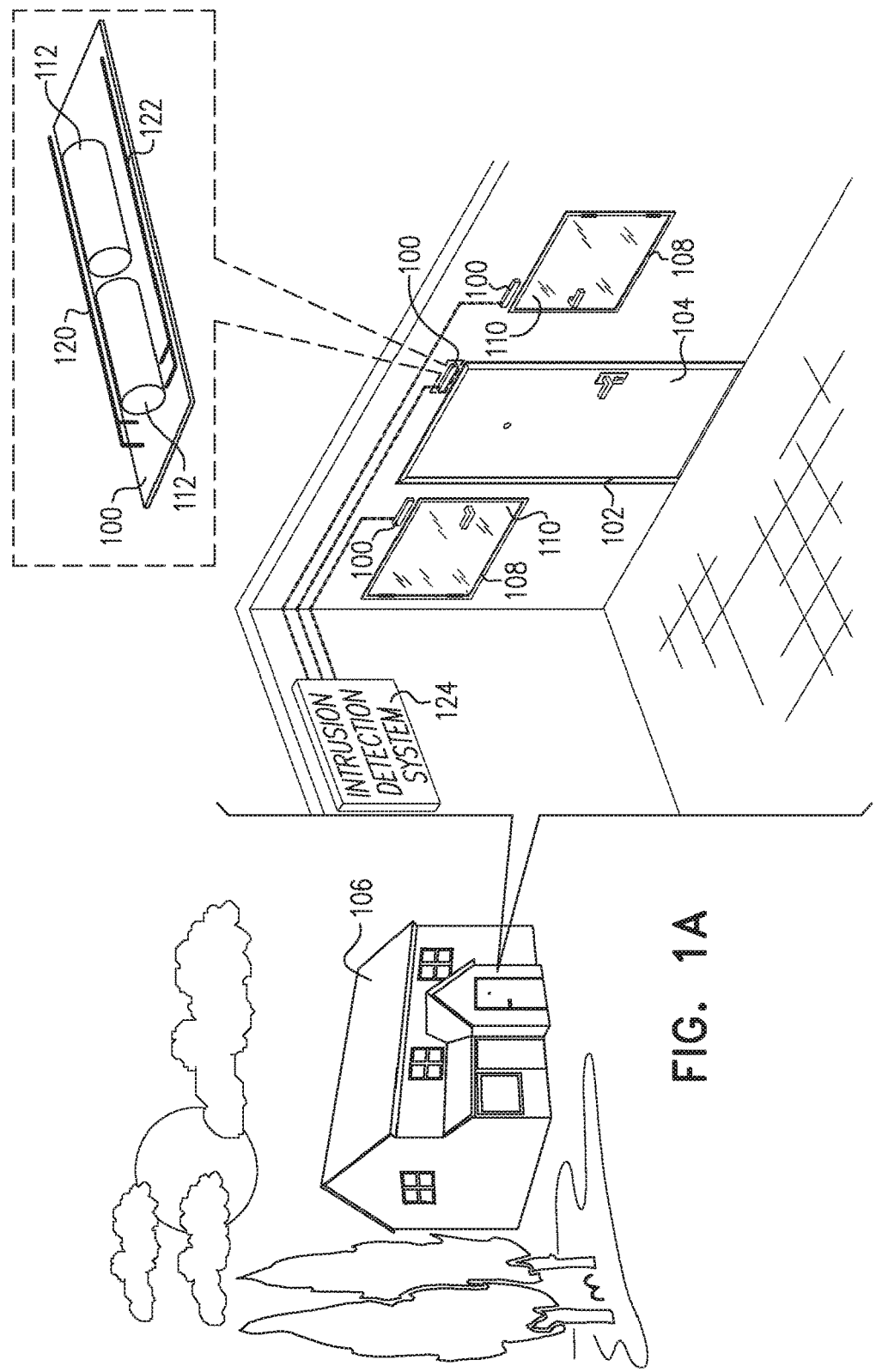
FIG. 1A is a simplified illustration of a single-element door\window opening detector, constructed and operative in accordance with a preferred embodiment of the present invention.

Reference is now made to FIG. 1A, which is a simplified illustration of a single-element door\window opening detector, constructed and operative in accordance with a preferred embodiment of the present invention.

As shown in FIG. 1A, there is provided a single-element door\window opening detector 100 which is preferably mounted, for example, on a frame 102 of a door 104 of premises 106, thereby being positioned to detect opening of door 104. As further shown in FIG. 1A, door\window opening detector 100 may be alternatively be mounted on a frame 108 of window 110 of premises 106, thereby being positioned to detect opening of window 110. It is appreciated that door 104 and window 110 are each made of a material having a corresponding given dielectric constant. Single-element door\window opening detector 100 is preferably powered by a power source such as, for example, one or more batteries 112.

As further shown in FIG. 1A, single-element door\window opening detector 100 preferably includes a first antenna 120 which is preferably mounted in a plane which is orthogonal to a plane of door 104 and a second antenna 122 which is preferably mounted in a plane which coincides with a plane of door 104. Antennas 120 and 122 are each preferably quarter wavelength, inverted-F type antennas. It is appreciated that each of antennas 120 and 122 have a corresponding first impedance within a first range of impedance when in proximity to door 104 made of a material having a given dielectric constant and a corresponding second impedance within a second range of impedance and not within the first range of impedance when not in proximity to door 104. It is appreciated that the second range of impedance is at least partially different from the first range of impedance.

It is further appreciated that in a case where door 104 is made at least mostly of metallic material, the impedance of antenna 120 mounted in a plane which is orthogonal to a plane of door 104 is more sensitive to changes in proximity to door 104 than that of antenna 122 mounted in a plane which coincides with a plane of door 104. It is further appreciated that in a case where door 104 is made at least mostly of dielectric material, the impedance of antenna 122 mounted in a plane which coincides with a plane of door 104 is more sensitive to changes in proximity to door 104 than that of antenna 120 mounted in a plane which is orthogonal to a plane of door 104.

It is a particular feature of the present invention that single-element door\window opening detector 100 is operable, responsive to detecting changes in the impedance of either of antennas 120 and 122, for ascertaining changes in proximity of single-element door\window opening detector 100 to door 104 and thereby ascertaining that door 104 has been opened. Single-element door\window opening detector 100 is preferably operable for communicating an alarm indication of opening of door 104 to an intrusion detection system 124 monitoring premises 106. It is appreciated that single-element door\window opening detector 100 may communicate with intrusion detection system 124 by wired or wireless communication.

Figure 1B:
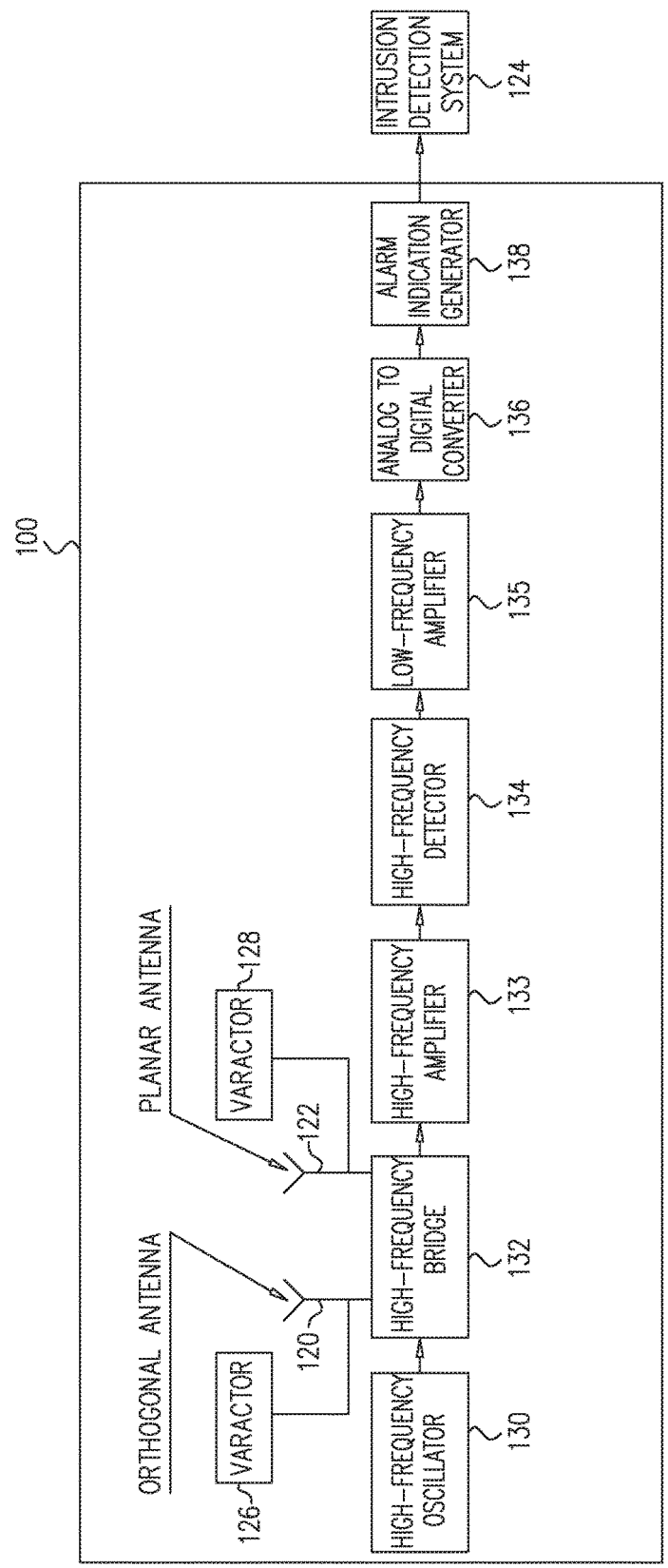
FIG. 1B is a simplified block diagram illustration of the single-element door\window opening detector of FIG. 1A.

Reference is now made to FIG. 1B, which is a simplified block diagram illustration of the single-element door\window opening detector of FIG. 1A. As described hereinabove with reference to FIG. 1A, single-element door\window opening detector 100 is preferably mounted, for example, on a frame of a door or of a window of a premises, thereby being positioned to detect opening of the door or of the window. It is appreciated that, typically, a door and a window are each made of a material having a corresponding given dielectric constant.

As further described hereinabove, single-element door\window opening detector 100 preferably includes a first antenna 120 which is preferably mounted in a plane which is orthogonal to a plane of door or of a window, and a second antenna 122 which is preferably mounted in a plane which coincides with a plane of the door or of the window. Antennas 120 and 122 are each preferably quarter wavelength, inverted-F type antennas. It is appreciated that each of antennas 120 and 122 have a corresponding first impedance within a first range of impedance when in proximity to a door made of a material having a given dielectric constant and a corresponding second impedance within a second range of impedance and not within the first range of impedance when not in proximity to the door.

It is further appreciated that in a case where the door or window is made at least mostly of metallic material, the impedance of antenna 120 mounted in a plane which is orthogonal to a plane of the door or window is more sensitive to changes in proximity to the door or window than that of antenna 122 mounted in a plane which coincides with a plane of the door or window. It is further appreciated that in a case where the door or window is made at least mostly of dielectric material, the impedance of antenna 122 mounted in a plane which coincides with a plane of the door or window is more sensitive to changes in proximity to the door or window than that of antenna 120 mounted in a plane which is orthogonal to a plane of the door or window. Antennas 120 and 122 are preferably operable to be tuned by respective varactors 126 and 128.

It is a particular feature of the present invention that single-element door\window opening detector 100 is operable, responsive to detecting changes in the impedance of either of antennas 120 and 122, for ascertaining changes in proximity of single-element door\window opening detector 100 to door 104 and thereby ascertaining that the door has been opened.

Single-element door\window opening detector 100 also preferably includes a high frequency oscillator 130 operable for generating a high frequency oscillating electromagnetic signal for excitation of antennas 120 and 122. A high frequency bridge 132 is preferably provided for transmitting the high frequency oscillating electromagnetic signal generated by high frequency oscillator 130 to at least one of antennas 120 and 122 and, responsive to receiving the high frequency oscillating electromagnetic signal by a corresponding one of antennas 120 and 122, for measuring an impedance of the corresponding one of antennas 120 and 122 and for generating an impedance-dependent electromagnetic signal corresponding to the measured impedance. As described hereinabove, high frequency bridge 132 preferably measures the impedance of one of the one of antenna 120 and 122 which is suitable for detecting changes in proximity to door 104 as dictated by the material of which door 104 is made. Alternatively, high frequency bridge 132 may be operable for measuring the impedance of both of antennas 120 and 122.

A high-frequency amplifier 133 is preferably provided for amplifying the impedance-dependent electromagnetic signal generated by high frequency bridge 132 and for transmitting the amplified signal to a high-frequency detector 134. High-frequency detector 134 is preferably operable for receiving the amplified electromagnetic signal corresponding to the measured impedance from high-frequency amplifier 133 and for generating a direct electrical current corresponding to the electromagnetic signal corresponding to the measured impedance.

A low-frequency amplifier 135 is preferably provided for amplifying a voltage of the direct electrical current generated by high-frequency detector 134 and for transmitting amplified direct electrical current to an analog to digital converter 136. Analog to digital converter 136 is preferably operable for receiving the direct electrical current from low-frequency amplifier 135 and for converting the direct electrical current into a digital value.

Single-element door\window opening detector 100 also preferably includes an alarm indication generator 138 which is preferably operable for receiving the digital value from analog to digital converter 136 and for ascertaining, based on the digital value, whether the measured antenna impedance has changed from being within the first range of impedance to being within the second range of impedance and not within the first range of impedance and that, therefore, at least one of antennas 120 and 122 is not in proximity to door 104.

It is a particular feature of the present invention that, responsive to ascertaining that at least one of antennas 120 and 122 is not in proximity to door 104 alarm indication generator 138 is also operable for generating an alarm indication of opening of door 104 and communicating the alarm indication of opening of door 104 to intrusion detection system 124 monitoring premises 106. It is appreciated that single-element door\window opening detector 100 may communicate with intrusion detection system 124 by wired or wireless communication.

It will be appreciated by persons skilled in the art that the present invention is not limited by what has been particularly shown and described hereinabove. Rather the scope of the present invention includes both combinations and subcombinations of the various features described hereinabove as well as modifications thereof which would occur to persons skilled in the art upon reading the foregoing description and which are not in the prior art.

The invention claimed is:

1. An article proximity indicator comprising:
a first antenna mounted in a first plane which is orthogonal to a plane of an article having a given dielectric constant, said first antenna having a first range of impedance and a second range of impedance, said second range of impedance being at least partially different from said first range of impedance, said first antenna having a first antenna impedance within said first range of impedance when in proximity to said article and within said second range of impedance and not within said first range of impedance when not in proximity to said article;
a second antenna mounted in a second plane which coincides with said plane of said article, said second antenna having a third range of impedance and a fourth range of impedance, said third range of impedance being at least partially different from said fourth range of impedance, said second antenna having a second antenna impedance within said third range of impedance when in proximity to the article and within said fourth range of impedance and not within said third range of impedance when not in proximity to said article; and
a proximity indication generator operable, in response to receiving at least one of a first indication that said first antenna impedance of said first antenna has changed from being within said first range of impedance to being within said second range of impedance and not within said first range of impedance or a second indication that said second antenna impedance of said second antenna has changed from being within said third range of impedance to being within said fourth range of impedance and not within said third range of impedance, for generating a proximity indication indicating that at least one of said first antenna or said second antenna is not in proximity to said article.

2. The article proximity indicator according to claim 1 and also comprising a high frequency oscillator operable for generating a high frequency oscillating electromagnetic signal for excitation of at least one of said first antenna or said second antenna.

3. The article proximity indicator according to claim 2 and also comprising a high frequency bridge coupled to said high frequency oscillator and to at least one of said first antenna or said second antenna and operable:
for transmitting said high frequency oscillating electromagnetic signal generated by said high frequency oscillator to said first antenna or said second antenna; and
responsive to receiving said high frequency oscillating electromagnetic signal by at least one of said first antenna or said second antenna, for measuring at least one of said first antenna impedance or said second antenna impedance and for generating an impedance-dependent electromagnetic signal corresponding to at least one of said first antenna impedance or said second antenna impedance.

4. The article proximity indicator according to claim 3 and also comprising:
   a high-frequency amplifier operable for amplifying said impedance-dependent electromagnetic signal generated by said high frequency bridge; and
   a high-frequency detector operable for receiving said amplified impedance-dependent electromagnetic signal from said high-frequency amplifier and for generating a direct electrical current corresponding to said amplified impedance-dependent electromagnetic signal.

5. The article proximity indicator according to claim 4 and also comprising:
   a low-frequency amplifier operable for amplifying a voltage of said direct electrical current generated by said high-frequency detector; and
   an analog to digital converter operable for receiving said amplified direct electrical current from said low-frequency amplifier and for converting said amplified direct electrical current into a digital value.

6. The article proximity indicator according to claim 5 and wherein said proximity indication generator is also operable:
   for receiving said digital value from said analog to digital converter; and
   for ascertaining, based on said digital value, whether said first antenna impedance of said first antenna has changed from being within said first range of impedance to being within said second range of impedance and not within said first range of impedance or whether said second antenna impedance of said second antenna has changed from being within said third range of impedance to being within said fourth range of impedance and not within said third range of impedance.

7. The article proximity indicator according to claim 1 and wherein said article is at least mostly made of metallic material and wherein said first antenna is more sensitive to changes in said proximity to said article than said second antenna.

8. The article proximity indicator according to claim 1 and wherein said article is at least mostly made of dielectric material and wherein said second antenna is more sensitive to changes in said proximity to said article that said first antenna.

9. The article proximity indicator according to claim 1 and also comprising at least one varactor operable for tuning said first antenna or said second antenna.

10. An article proximity detection method, comprising:
    receiving a first indication of a first measurement of a first antenna impedance of a first antenna mounted in a first plane which is orthogonal to a plane of an article having a given dielectric constant, said first antenna having at least a first range of impedance and a second range of impedance, said second range of impedance being at least partially different from said first range of impedance, said first antenna having the first antenna impedance within said first range of impedance when in proximity to said article and within said second range of impedance and not within said first range of impedance when not in proximity to said article;
    receiving a second indication of a second measurement of a second antenna impedance of a second antenna mounted in a second plane which coincides with said plane of said article, said second antenna having a third range of impedance and a fourth range of impedance, said fourth range of impedance being at least partially different from said third range of impedance, said second antenna having said second antenna impedance within said third range of impedance when in proximity to the article and within said fourth range of impedance and not within said third range of impedance when not in proximity to said article; and
    in response to receiving said first indication indicating that said first antenna impedance of said first antenna has changed from being within said first range of impedance to being within said second range of impedance and not within said first range of impedance or receiving said second indication indicating that said second antenna impedance of said second antenna has changed from being within said third range of impedance to being within said fourth range of impedance and not within said third range of impedance, generating a proximity indication indicating that at least one of said first antenna or said second antenna is not in proximity to said article.

11. The article proximity detection method according to claim 10 and also comprising generating a high frequency oscillating electromagnetic signal for excitation of at least one of said first antenna or said second antenna.

12. The article proximity detection method according to claim 11 and also comprising:
    transmitting said high frequency oscillating electromagnetic signal to at least one of said first antenna or said second antenna; and
    responsive to receiving said high frequency oscillating electromagnetic signal by at least one of said first antenna or said second antenna, measuring at least one of said first antenna impedance or said second antenna impedance and generating an impedance-dependent electromagnetic signal corresponding to at least one of said first antenna impedance or said second antenna impedance.

13. The article proximity detection method according to claim 12 and also comprising:
    amplifying said impedance-dependent electromagnetic signal; and
    generating a direct electrical current corresponding to said amplified impedance-dependent electromagnetic signal.

14. The article proximity detection method according to claim 13 and also comprising:
    amplifying a voltage of said direct electrical current; and
    converting said amplified direct electrical current into a digital value.

15. The article proximity detection method according to claim 14 and also comprising ascertaining, based on said digital value, whether said first antenna impedance of said first antenna has changed from being within said first range of impedance to being within said second range of impedance and not within said first range of impedance or whether said second antenna impedance of said second antenna has changed from being within said third range of impedance to being within said fourth range of impedance and not within said third range of impedance.

16. The article proximity detection method according to claim 10 and wherein said article is at least mostly made of metallic material and wherein said first antenna is more sensitive to changes in said proximity to said article than said second antenna.

17. The article proximity detection method according to claim 10 and wherein said article is at least mostly made of dielectric material and wherein said second antenna is more sensitive to changes in said proximity to said article than said first antenna.

18. The article proximity detection method according to claim 10 and also comprising tuning at least one of said first antenna or said second antenna.

19. A door\window opening detector, comprising:
at least one antenna having at least a first range of impedance and a second range of impedance, said second range of impedance being at least partially different from said first range of impedance, said at least one antenna having an impedance within said first range of impedance when in proximity to a door\window having a given dielectric constant and within said second range of impedance and not within said first range of impedance when not in proximity to said door\window having said given dielectric constant; and
an alarm indication generator operable, in response to receiving an indication that said impedance of said at least one antenna has changed from being within said first range of impedance to being within said second range of impedance and not within said first range of impedance, for generating an alarm indication of opening of said door\window.

20. The door\window opening detector according to claim 19 and also comprising a high frequency oscillator operable for generating a high frequency oscillating electromagnetic signal for excitation of said at least one antenna.

21. The door\window opening detector according to claim 20 and also comprising a high frequency bridge coupled to said high frequency oscillator and to said at least one antenna and operable:
for transmitting said high frequency oscillating electromagnetic signal generated by said high frequency oscillator to said at least one antenna; and
responsive to receiving said high frequency oscillating electromagnetic signal by said at least one antenna, for measuring said impedance of said at least one antenna and for generating an impedance-dependent electromagnetic signal corresponding to said impedance.

22. The door\window opening detector according to claim 21 and also comprising:
a high-frequency amplifier operable for amplifying said impedance-dependent electromagnetic signal generated by said high frequency bridge; and
a high-frequency detector operable for receiving said amplified impedance-dependent electromagnetic signal from said high-frequency amplifier and for generating a direct electrical current corresponding to said amplified impedance-dependent electromagnetic signal.

23. The door\window opening detector according to claim 22 and also comprising:
a low-frequency amplifier operable for amplifying a voltage of said direct electrical current generated by said high-frequency detector; and
an analog to digital converter operable for receiving said amplified direct electrical current from said low-frequency amplifier and for converting said amplified direct electrical current into a digital value.

24. The door\window opening detector according to claim 23 and wherein said alarm indication generator is also operable:
for receiving said digital value from said analog to digital converter; and
for ascertaining, based on said digital value, whether said impedance of said at least one antenna has changed from being within said first range of impedance to being within said second range of impedance and not within said first range of impedance.

25. The door\window opening detector according to claim 19 and wherein said door\window is at least mostly made of metallic material and said at least one antenna comprises an antenna which is mounted in a plane which is orthogonal to a plane of said door\window.

26. The door\window opening detector according to claim 19 and wherein said door\window is at least mostly made of dielectric material and said at least one antenna comprises an antenna which is mounted in a plane which coincides with a plane of said door\window.

27. The door\window opening detector according to claim 19 and also comprising at least one varactor operable for tuning said at least one antenna.

28. The door\window opening detector according to claim 19 and wherein said alarm indication generator is also operable for transmitting said alarm indication of said opening of said door\window to a premises monitoring system operable for monitoring a premises of said door\window.

29. A door\window opening detection method comprising:
receiving an indication of a measurement of an impedance of at least one antenna, said at least one antenna having at least a first range of impedance and a second range of impedance, said second range of impedance being at least partially different from said first range of impedance, said at least one antenna having an impedance within said first range of impedance when in proximity to an door\window having a given dielectric constant and within said second range of impedance and not within said first range of impedance when not in proximity to said door\window having said given dielectric constant; and
in response to receiving an indication that said impedance of said at least one antenna has changed from being within said first range of impedance to being within said second range of impedance and not within said first range of impedance, generating an alarm indication of opening of said door\window.

30. The door\window opening detection method according to claim 29 and also comprising generating a high frequency oscillating electromagnetic signal for excitation of said at least one antenna.

31. The door\window opening detection method according to claim 30 and also comprising:
transmitting said high frequency oscillating electromagnetic signal to said at least one antenna, and
responsive to receiving said high frequency oscillating electromagnetic signal by said at least one antenna, measuring said impedance of said at least one antenna and generating an impedance-dependent electromagnetic signal corresponding to said impedance.

32. The door\window opening detection method according to claim 31 and also comprising:
amplifying said impedance-dependent electromagnetic signal; and
generating a direct electrical current corresponding to said amplified impedance-dependent electromagnetic signal.

33. The door\window opening detection method according to claim 32 and also comprising:
amplifying a voltage of said direct electrical current; and
converting said amplified direct electrical current into a digital value.

34. The door\window opening detection method according to claim 33 and also comprising ascertaining, based on said digital value, whether said impedance of said at least one antenna has changed from being within said first range of impedance to being within said second range of impedance and not within said first range of impedance.

35. The door\window opening detection method according to claim 29 and wherein said door\window is at least mostly made of metallic material and said at least one antenna comprises an antenna which is mounted in a plane which is orthogonal to a plane of said door\window.

36. The door\window opening detection method according to claim 29 and wherein said door\window is at least mostly made of dielectric material and said at least one antenna comprises an antenna which is mounted in a plane which coincides with a plane of said door\window.

37. The door\window opening detection method according to claim 29 and also comprising tuning said at least one antenna.

38. The door\window opening detection method according to claim 29 and also comprising transmitting said alarm indication of said opening of said door\window to a premises monitoring system operable for monitoring a premises of said door\window.

\* \* \* \* \*

UNITED STATES PATENT AND TRADEMARK OFFICE
CERTIFICATE OF CORRECTION

PATENT NO. : 10,475,317 B2
APPLICATION NO. : 15/843763
DATED : November 12, 2019
INVENTOR(S) : Alexander Shapira Page 1 of 1

It is certified that error appears in the above-identified patent and that said Letters Patent is hereby corrected as shown below:

On the Title Page

Item (72):
Inventor's city reads:
Petakh Tikva, (IL)

Should read:
Petah Tikva, (IL)

In the Claims

Column 9, Line 46 Claim 8, replace "that" with --than--

Column 12, Line 23 Claim 29, replace "method" with --method,--

Signed and Sealed this
Eighteenth Day of February, 2020

Andrei Iancu
*Director of the United States Patent and Trademark Office*